3,359,353
PROCESS FOR MAKING POROUS EXPANDED-THERMOPLASTIC ARTICLES
Piero Oddi, Milan, Italy, assignor, by mesne assignments, to Montecatini Edison S.p.A., a corporation of Italy
Filed Feb. 26, 1964, Ser. No. 347,384
Claims priority, application Italy, Mar. 2, 1963, 4,421/63
6 Claims. (Cl. 264—53)

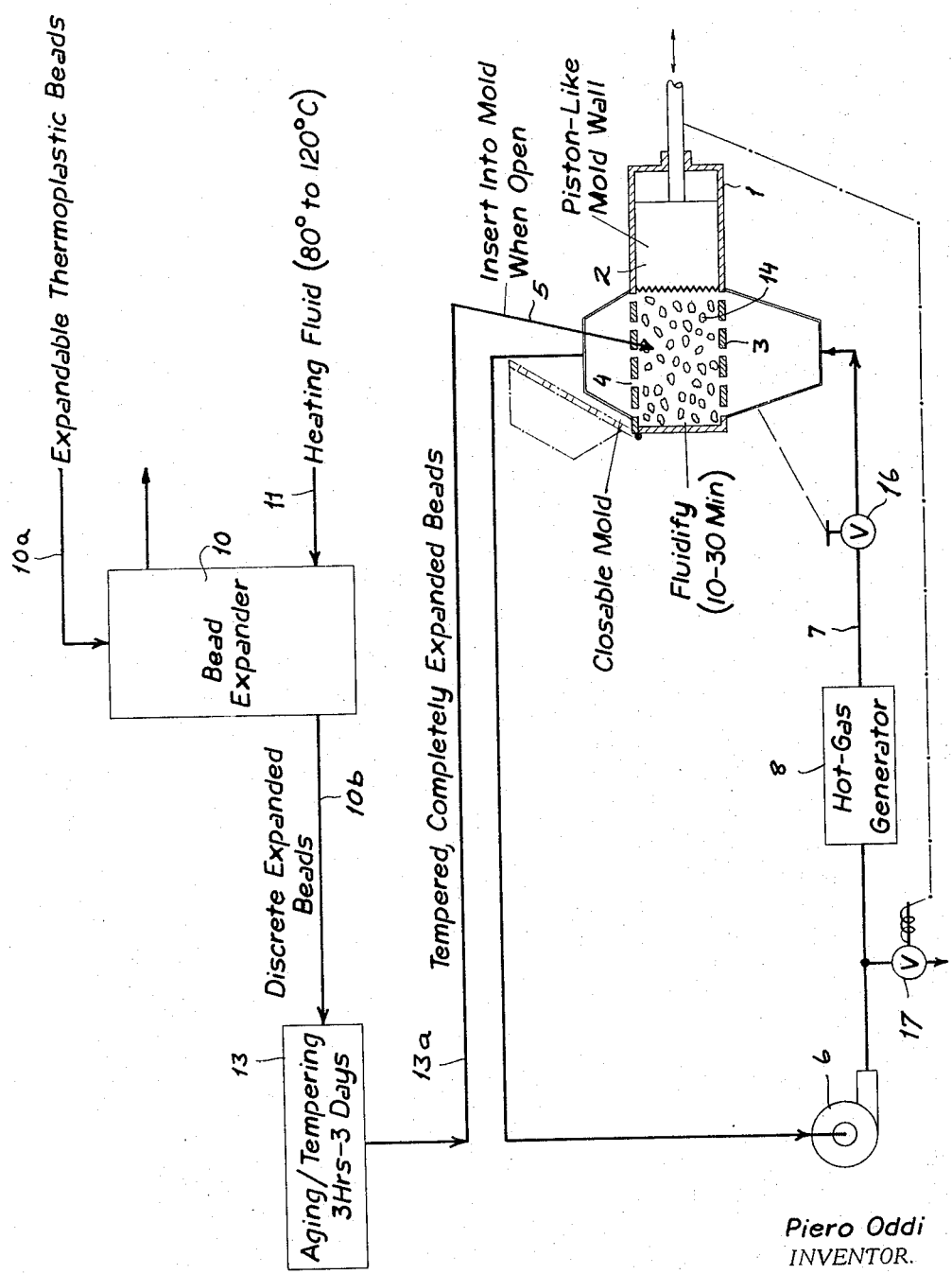

The present invention relates to the production of shaped porous articles from particles of a thermoplastic resin which contain an expanding agent for causing expansion on heating.

Such a finely granulated expandable resin may be produced either by the incorporation of the expanding agent into the particles by simple physical contact of the granulated thermoplastic resin with the expanding agent, or by mixing an expanding agent with the monomer, or with the polymer in solution in the monomer prior to polymerization.

In the usual technique, shaped porous articles are obtained by heating the thermoplastic expandable resins in the form of beads containing the expanding agent homogeneously dispersed therein, or in the form of partially expanded beads still containing some expanding agent; the heating may be by means of hot water or vapor in suitable closed molds provided with holes. During the heating, which is carried out at a temperature close to the softening point of the thermoplastic resin, the complete expansion of the expandable or pre-expanded particles and the simultaneous sintering (i.e. thermal fusion) of these particles occurs, and a porous article of low apparent density is produced.

When using the expandable particles, though the mold is only filled initially to one-tenth of its volume, relatively high expansion pressures build up during heating and this leads to crumbling of the body.

According to other known techniques which use partially pre-expanded particles, the mold is filled completely and the hot heating fluid enters the mold through holes in its walls and starts to expand and fuse together those resin particles which are closest to the walls of the mold so that they form a heat-insulating layer. This tends to prevent the uniform distribution of heat among the particles, particularly in the case of large bodies, and leads to an inhomogeneity of physical quality in the resulting porous body; thus in some parts of the body, the particles will often be fused together rather weakly so that the resulting body has a certain tendency to crumble.

This invention provides a process free from these drawbacks and which gives articles of synthetic thermoplastic porous material of low apparent density and with uniform physical and mechanical characteristics throughout its mass.

One aspect of this invention is a process starting from expanded particles substantially free from expanding agents.

Using a preferred process of this invention, it is possible to select the apparent density of the porous bodies, having regard to the use for which they are intended, thanks to a closed mold which is also a feature of this invention and is described in more detail below.

Bodies made by the process of this invention evidence a fusion of the individual particles which is perfectly uniform at all points throughout the porous mass. Moreover, the use of hot fluids (e.g. air) for heating during the molding stage of the expanded particles, avoids complicated procedures such as those necessary for the production of steam.

The present invention resides in a process for producing shaped porous articles of thermoplastic resin, which comprises the steps of (a) heating expandable particles of synthetic thermoplastic material (containing at least one expanding agent homogeneously dispersed therein) by a hot gas (e.g. air) or vapor (e.g. saturated steam) stream under such conditions that the particles become fully expanded but do not agglomerate; (b) tempering the expanded particles; and (c) introducing the expanded particles (substantially free from expanding agent) into closed molds heating the particles with hot gases or vapors in order to bring them to their incipient softening point, while applying to them a mechanical compression simultaneously with said heating in order to sinter the single particles into a unitary porous body.

Preferably in the process according to the present invention the synthetic thermoplastic material is a polymer and/or a copolymer of styrene, vinyl chloride, acrylonitrile or methylmethacrylate and the like.

The first phase of the process consists in subjecting the expandable particles of the synthetic thermoplastic material to heat by means of a hot gas or vapor stream, particularly steam, at temperatures near the Martens' number of the synthetic thermoplastic substance (incipient softening point). These particles should be free to move in the stream of the hot gas or vapor stream so that they become fully expanded without agglomerating.

The expanded particles may be tempered for from 3 hrs. to 3 days and preferably from 12 hrs. to 48 hrs. The molding stage is preferably carried out in a closed mold having one or more inwardly movable walls by means of which a mechanical compression is applied to the expanded particles as these are heated at incipient softening temperature, in order to render the particles coherent.

Preferably one or more pipes are connected to the side walls of said mold to blow hot gas or vapour in at the bottom of the mold to pass upwards inside it.

For example, polystyrene particles, expanded and tempered, substantially free from expanding agent, obtained from the first phase of the process according to the present invention, are introduced in the desired quantity into the mold; thereupon hot gas is injected and the expanded polystyrene particles, moving freely (i.e. in a fluent or fluidified state) inside the mold under the action of the hot gas stream, are uniformly heated to the incipient softening point, without any agglomeration. Then, by means of the movable section of the mold, compression is applied to the heated expanded particles to a predetermined volume, thereby fusing the discrete individual particles into a coherent unitary porous body of low apparent density. By varying within ascertainable limits, the quantity of particles introduced into the mold, it is possible to select the apparent density of the porous bodies for equal compressions and for equal final volumes, with a view to the use to which the bodies may be put.

Conversely, in order to obtain panels of a particular perimeter, it is possible to vary their apparent density and, thus, their thickness by just varying more or less the degree of compression.

By the process according to the present invention, porous bodies may be obtained having excellent physical and mechanical qualities, such as compactness of the material, dimensional stability of the porous article (such that it does not shrink during cooling), and resistance to crushing, to tensile stresses or to crumbling. The apparent density may be varied from 200 k.g./m.$^3$ to 10 k.g./m.$^3$.

When hot air or other hot gases are used as a heating medium during the moulding stage, the expanded particles are perfectly dry, and the sintering stage will take place much more easily and the resulting molded bodies will be very homogeneous.

These advantages and otherrs still will be achieved furthermore through the use of the mold with closed walls, of which one or more are movable as described above.

The invention will be further described with reference to the following illustrative but not restrictive examples, which do not limit the scope of this invention as defined in the appended claims.

The invention is described in greater detail with reference to the accompanying drawing, the sole feature of which represents in diagrammatic form a system for carrying out the process of the invention.

In the drawing I show a closable mold constituted with a body 1 of any desirable configuration, at one end of which is provided a movable piston 2 which constitutes the movable wall of the mold. The mold body 1 has an upper perforated wall 4 and a lower perforated wall 3 through which a gaseous fluid may be circulated as described earlier. A line 5 is represented as communicating with the mold cavity 14 to deliver the completely expanded and aged thermoplastic beads or particles to it. When the mold is closed, a fan 6 introduces via a duct 7 air or some other heating fluid generated in the heater or producer 8 to a hood communicating with the chamber 14 from below via the perforated section 3. Cool air is drawn by another hood above the perforated section 4, and a pipe 9, from the mold cavity and recirculated by the fan 6.

At 10, I show a system for expanding the expandable beads substantially completely. For this purpose, a hot gas is introduced at 11 and spent gas is recovered at 12. The introduction of the expandable thermoplastic beads is represented by the inlet 10a and the outlet 10b for these beads. The latter duct is shown to lead to a tempering chamber, represented at 13. The aging or tempering operation occupies between 3 hours and 3 days and terminates in a delivery of the tempered completely expanded beads to the hopper 5 via the line 13a. After fluidification in the mold of the mass of completely expanded thermoplastic discrete beads via the gas circulated by blower 6 for a period of 10 to 30 minutes, the valve 17 may be opened to vent the system while throttle valve 16 maintains the pressure within the chamber below atmospheric as the piston 2 is advanced to compact the particles.

EXAMPLE 1

5 kg. of expandable polystyrene particles containing homogeneously dispersed pentane as an expanding agent, were heated in a current of steam at 115° C. for 20 minutes in an incompletely filled vessel, so that the particles were fluidified and free to move in the current of steam and did not aggregate with one another. The volume increase corresponded to an average of about 100 times the starting volume. This volume proved to be substantially the greatest which could be achieved with substantially complete disappearance of expanding agent from the porous particles obtained.

These expanded particles, substantially free from expanding agent, were permitted to cool in air for an aging period of 24 hrs., and afterwards were placed in a mold with flat walls and of rectangular section as described above.

A hot air stream at 115–118° C., was blown in through the flow pipes, preferably at the base of the mold walls, the particles filling the mold up to the piston.

The expanded particles were whirled about in the air stream for 10 minutes so as to become uniformly warm, until the incipient softening temperature was reached. Then a compression of 5 atm. was applied for 30 minutes by means of the movable part of the mold in order to agglomerate the softened particles into a unitary porous body.

After cooling a porous rectangular 4 cm. thick panel with an apparent density of 20 kg./m.$^3$ was obtained. It appeared compact and homogeneous; it resisted crumbling even in the interior; it was resistant to compression and breakage; and it was very suitable as heat and sound-insulating material.

EXAMPLE 2

0.30 kg. of particles of polystyrene, completely expanded and wholly free from residual expanding agent, obtained as in the Example 1, was placed in a mold according to the invention, having a circular section with a radius of 20 cm. and a height of 100 cm.

Hot air at 95° C. was blown in for 30 minutes. The hot-air flow was then stopped and a pressure of 7 kg. was applied on the mass to agglomerate it. A porous cylindrical article having a height of 40 cm. and an apparent density of 25 kg./m.$^3$ was obtained. With the same mold and the same amount of starting porous particles, but a pressure of 8 kg. an apparent density of 40 kg./m.$^3$ was obtained; with a pressure of 10 atm. an apparent density of 60 kg./m.$^3$ was obtained; with a pressure of 12 atm. an apparent density of 80 kg./m.$^3$ was obtained.

EXAMPLE 3

0.1 kg. of polystyrene porous particles obtained as in Example 1 were placed in a mold, according to the invention, having a square section with sides 50 cm. long and a height of 150 cm. Hot air at 105° C. was blown in for 15 minutes while the movable part of the mold applied a pressure of 5 atm. on the particles to be agglomerated for 30 minutes. The body obtained after cooling was cut into 5 cm. thick panels; these appeared homogeneous over their whole surface and had an apparent density of 22 kg./m.$^3$ at every point.

Operating in the same way as in the previous example it was possible to obtain hollow bodies with curved surfaces, such as dolls, puppets or advertising material, by employing members of wood or other suitable material within the mold of the present invention.

One of these members can be set up on the bottom of the mold and the other under the movable part of the mold so that during the compression the porous mass, formed in the gap between the two members assumes the configuration of the gap.

The "Martens Number" of the synthetic thermoplastic substance which is mentioned in the description of the present invention is defined by R. Howink in "Fundamentals of Synthetic Polymer Technology in Chemical and Physical Aspects" issued in 1949, page 73.

I claim:

1. In a process for producing unitary coherent porous bodies from particles of an expandable thermoplastic synthetic resin containing an expanding agent distributed in said particles and adapted to expand the latter upon heating of said particles, wherein the particles are heated in a hot gaseous fluid to expand said particles substantially completely without agglomeration of the expanded particles, the improvement which comprises the steps of:

(a) confining the individual nonagglomerated substantially completely expanded particles into an incompletely filled mold and subjecting them to a flow of a hot particle fluidizing gas of a temperature at least sufficient to bring said particles to their incipient softening point and to entrain said particles with said hot gas in substantially free motion in said mold; and (b) compressing the moving particles in said mold while said particles are at a temperature of at least said incipient softening point by applying to said particles an externally derived compacting pressure by reducing the volume of said mold to agglomerate the particles and fuse them into a unitary porous body.

2. The improvement defined in claim 1 wherein said synthetic resin is selected from the group consisting of polymers and copolymers of styrene, vinyl chloride, acrylonitrile and methyl methacrylate.

3. The improvement defined in claim 1 wherein the expandable particles are heated in a gas stream at a temperature of 80 to 120° C. to expand them substantially completely without agglomeration.

4. The improvement defined in claim 3 wherein the gas stream is hot air.

5. The improvement defined in claim 4 wherein the gas stream is steam.

6. The improvement defined in claim 1 wherein the particles are suspended and entrained in a random motion by the hot gas of step (a) for a period of 10 to 30 minutes prior to compaction in step (b).

References Cited

UNITED STATES PATENTS

| | | | |
|---|---|---|---|
| 2,744,291 | 5/1956 | Stastny et al. | 264—53 |
| 2,787,809 | 4/1957 | Stastny | 264—53 |
| 3,080,612 | 3/1963 | Buchmann | 264—321 X |
| 3,129,464 | 4/1964 | Heiden | 264—53 X |
| 3,139,466 | 6/1964 | Couchman | 264—53 X |
| 3,162,704 | 12/1964 | Attanasio et al. | 264—53 |
| 3,202,734 | 8/1965 | Young | 264—53 |
| 3,252,228 | 5/1966 | Ehrenfreund | 264—53 X |
| 3,255,286 | 6/1966 | Luc-Belmont | 264—109 |

FOREIGN PATENTS

| | | |
|---|---|---|
| 623,804 | 7/1961 | Canada. |

ALEXANDER H. BRODMERKEL, *Primary Examiner.*

P. E. ANDERSON, *Assistant Examiner.*